United States Patent
Ng et al.

(10) Patent No.: US 11,090,724 B2
(45) Date of Patent: Aug. 17, 2021

(54) ADDITIVE MANUFACTURING WITH POWDER DISPENSING

(71) Applicant: Applied Materials, Inc., Santa Clara, CA (US)

(72) Inventors: Hou T. Ng, Campbell, CA (US); Nag B. Patibandla, Pleasanton, CA (US); Daihua Zhang, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 14 days.

(21) Appl. No.: 15/926,997

(22) Filed: Mar. 20, 2018

(65) Prior Publication Data

US 2019/0202127 A1 Jul. 4, 2019

Related U.S. Application Data

(60) Provisional application No. 62/611,289, filed on Dec. 28, 2017.

(51) Int. Cl.
*B33Y 10/00* (2015.01)
*B22F 10/10* (2021.01)
(Continued)

(52) U.S. Cl.
CPC ............ *B22F 10/10* (2021.01); *B22F 1/0059* (2013.01); *B22F 3/10* (2013.01); *B22F 3/15* (2013.01);
(Continued)

(58) Field of Classification Search
CPC .......... B22F 3/008; B33Y 10/00; B33Y 30/00
See application file for complete search history.

(56) References Cited

U.S. PATENT DOCUMENTS

| 6,508,980 B1 | 1/2003 | Sachs et al. |
| 2010/0191360 A1 | 7/2010 | Napadensky et al. |

(Continued)

FOREIGN PATENT DOCUMENTS

| CN | 103817767 A | 5/2014 |
| CN | 104150915 A | 11/2014 |

(Continued)

OTHER PUBLICATIONS

PCT International Search Report and Written Opinion in International Application No. PCT/US2018/067670, dated Apr. 17, 2019, 14 pages.

*Primary Examiner* — Joseph S Del Sole
*Assistant Examiner* — Yung-Sheng M Tsui
(74) *Attorney, Agent, or Firm* — Fish & Richardson P.C.

(57) ABSTRACT

An additive manufacturing apparatus has a platform, one or more supports positioned above the platform, an actuator coupled to at least one of the platform and the one or more supports and configured to create relative motion therebetween such that the one or more supports scan across the platform, a first dispenser system configured dispense a plurality of successive layers of powder onto a build area supported by the platform, a second dispenser system configured to dispense a binder material onto the build area, and an energy source configured to emit radiation toward the platform so as to solidify the binder material. The first dispenser system includes a first powder dispenser that is attached to and moves with a first support from the one or more supports and is configured to selectively dispense a first powder onto the build area.

13 Claims, 8 Drawing Sheets

(51) Int. Cl.
  *B33Y 30/00* (2015.01)
  *B28B 1/00* (2006.01)
  *C04B 35/624* (2006.01)
  *C04B 35/111* (2006.01)
  *C04B 35/50* (2006.01)
  *C04B 35/626* (2006.01)
  *C04B 35/581* (2006.01)
  *C04B 35/584* (2006.01)
  *C04B 35/634* (2006.01)
  *B28B 7/46* (2006.01)
  *C04B 35/14* (2006.01)
  *B29C 64/393* (2017.01)
  *B29C 64/165* (2017.01)
  *B29C 64/336* (2017.01)
  *B22F 1/00* (2006.01)
  *C04B 35/64* (2006.01)
  *B22F 3/10* (2006.01)
  *B22F 3/15* (2006.01)
  *B28B 11/24* (2006.01)
  *B33Y 40/00* (2020.01)
  *B33Y 50/02* (2015.01)

(52) U.S. Cl.
  CPC .............. *B28B 1/001* (2013.01); *B28B 7/465* (2013.01); *B28B 11/243* (2013.01); *B29C 64/165* (2017.08); *B29C 64/336* (2017.08); *B29C 64/393* (2017.08); *B33Y 10/00* (2014.12); *B33Y 30/00* (2014.12); *C04B 35/111* (2013.01); *C04B 35/14* (2013.01); *C04B 35/50* (2013.01); *C04B 35/581* (2013.01); *C04B 35/584* (2013.01); *C04B 35/624* (2013.01); *C04B 35/6264* (2013.01); *C04B 35/6269* (2013.01); *C04B 35/634* (2013.01); *C04B 35/64* (2013.01); *B33Y 40/00* (2014.12); *B33Y 50/02* (2014.12); *C04B 2235/5436* (2013.01); *C04B 2235/5454* (2013.01); *C04B 2235/5472* (2013.01); *C04B 2235/6026* (2013.01); *C04B 2235/665* (2013.01)

(56) References Cited

U.S. PATENT DOCUMENTS

| | | |
|---|---|---|
| 2011/0129640 A1 | 6/2011 | Beall et al. |
| 2015/0069649 A1 | 3/2015 | Bai et al. |
| 2015/0314530 A1 | 11/2015 | Rogren |
| 2016/0368054 A1* | 12/2016 | Ng ................. B29C 64/153 |
| 2017/0072466 A1 | 3/2017 | Zehavi et al. |
| 2017/0297097 A1 | 10/2017 | Gibson et al. |
| 2018/0001557 A1* | 1/2018 | Buller ................. B33Y 50/02 |
| 2019/0001570 A1* | 1/2019 | Branham ............ B29C 64/255 |
| 2019/0201975 A1 | 7/2019 | Ng et al. |
| 2019/0201976 A1 | 7/2019 | Ng et al. |
| 2019/0201977 A1 | 7/2019 | Ng et al. |

FOREIGN PATENT DOCUMENTS

| | | |
|---|---|---|
| WO | WO 2016/205758 | 12/2016 |
| WO | WO 2017/015159 | 1/2017 |
| WO | WO 2017/065796 | 4/2017 |
| WO | WO 2017/075244 | 5/2017 |
| WO | WO 2017/142506 | 8/2017 |

* cited by examiner

ADDITIVE MANUFACTURING WITH POWDER DISPENSING

CROSS-REFERENCE TO RELATED APPLICATIONS

This application claims priority to U.S. Application Ser. No. 62/611,289, filed on Dec. 28, 2017, the disclosure of which is incorporated by reference.

TECHNICAL FIELD

This specification relates to powder dispenser systems, binder dispensing systems, and energy delivery systems for additive manufacturing apparatuses, e.g., for manufacturing of a green part.

BACKGROUND

Additive manufacturing (AM), also known as solid freeform fabrication or 3D printing, refers to a manufacturing process in which three-dimensional objects are built up from successive dispensing of raw material (e.g., powders, liquids, suspensions, or molten solids) into two-dimensional layers. In contrast, traditional machining techniques involve subtractive processes in which articles are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM). Some methods cure liquid materials using different technologies, e.g., stereolithography (SLA). Some systems place binder materials onto layers of feed materials, e.g., powder, and use energy sources to cure the binder materials to bond loose powder particles together.

Some dry powder additive manufacturing apparatuses, such as binder-jetting 3D printers, can produce parts in a variety of materials. A typical binder jetting additive manufacturing process includes spreading a first uniform layer of powder across the platform. The powder particles can be of metal, ceramics, sand, plastic, a mixture of different materials, etc. The additive manufacturing apparatus then deposits binder materials onto the layer of powder at locations corresponding to a layer of the object to be fabricated. An energy source is used to cure the binder materials in order to bond powder particles together. After the binder material has been cured in the layer, the apparatus then spreads a second uniform layer of powder on top of the first layer, and repeats the binder depositing and curing steps. Once the apparatus finishes spreading all layers, a three-dimensional "green" part is formed within the pool of loose powder. The part is "green" in that the main constituent, i.e., the material provided by the powder, is held together by the binder material, and has not yet been sintered or fired to solidify the powder into a solid mass of material. The green part is formed of powder glued together by cured binder agents, and has a vertical spatial resolution equal to the thickness of each layer of powder. The loose powder particles can be recycled and stored for the next print. Depending on the type of powder particles, the green part may serve as the final product, or it may need to go through additional post-processing steps, such as annealing or sintering, hot isostatic pressing, etc., to form the final product.

SUMMARY

In one aspect, an additive manufacturing apparatus includes a platform, one or more supports positioned above the platform, an actuator coupled to at least one of the platform and the one or more supports and configured to create relative motion therebetween such that the one or more supports scan across the platform, a first dispenser system configured dispense a plurality of successive layers of powder onto a build area supported by the platform, a second dispenser system configured to dispense a binder material onto the build area, and an energy source configured to emit radiation toward the platform so as to solidify the binder material. The first dispenser system includes a first powder dispenser that is attached to and moves with a first support from the one or more supports and is configured to selectively dispense a first powder onto the build area. The second dispenser system includes a first binder material dispenser configured to selectively dispense a first binder material on a voxel-by-voxel basis to an uppermost layer of powder in the build area to form a volume of the layer having powder and binder material and corresponding to a cross-sectional portion of a part being built.

Implementations may include one or more of the following features.

The first support may be movable along a first axis, and the first powder dispenser may be configured to selectively dispense the powder in a strip along a second axis that is at a non-zero angle, e.g., perpendicular, relative to the first axis. The first powder dispenser may be configured to selectively dispense the powder on a voxel-by-voxel basis along the second axis, or on a region-by-region basis along the second axis where regions are larger than voxels.

The first binder material dispenser and energy source may be attached to and move with the first support. The first binder material dispenser may be configured to selectively dispense the binder material in a strip along the second axis. The first binder material may include a densification material.

The first binder material dispenser and energy source may be attached to and move with a second support from the one or more supports, the second support may be movable along a third axis, and the first binder material dispenser may be configured to selectively dispense the binder material in a strip along a fourth axis that is at a non-zero angle, e.g., perpendicular, relative to the third axis. The third axis may be parallel to the first axis. The fourth axis may be parallel to the third axis. The first support and the second support may be connected to and independently movable on a guide rail. The first support may be movable on a first guide rail and the second support may be movable on a second guide rail parallel to the first guide rail. The third axis may be perpendicular to the first axis. The fourth axis may be perpendicular to the third axis.

The first powder dispenser may be configured to selectively dispense the powder on a voxel-by-voxel basis. The first powder dispenser may be configured to selectively dispense the powder on a region-by-region basis, where regions are larger than voxels. The first powder dispenser may have a first plurality of individually controllable orifices, each orifice of the first plurality of orifices configured to controllably deliver the first powder. The first powder dispenser may span a width of the build area. The first dispenser system may include a plurality of first powder dispensers, each first powder dispenser attached to the first support. The plurality of first powder dispensers may be arranged in a staggered pattern so as to cover a width of the build area.

A controller may have a memory configured to store a data object that identifies a pattern in which the binder material is to be solidified in a layer of an object to be fabricated. The controller may be configured to, for the layer, cause the actuator to create relative motion between the support and the platform, cause the first dispenser system to dispense a layer of powder in regions that encompasses the cross-sectional portion of the part being built as the support scans across the platform, cause the second dispenser system to dispense a layer of binder material on the layer of powder in the pattern based on the data object to provide the combined layer of powder and binder material corresponding to the cross-section of the part being built, and control the energy source to solidify the binder material in the combined layer in accord with the pattern.

A controller may have a memory configured to store a data object that identifies a pattern in which the binder material is to be solidified in a layer of an object to be fabricated. The controller may be configured to configured to, for the layer, cause the actuator to create relative motion between the support and the platform, cause the first dispenser system to dispense a layer of powder in regions that encompasses the cross-sectional portion of the part being built as the support scans across the platform, cause the second dispenser system to dispense a layer of binder material on the layer of powder in the pattern based on the data object to provide the combined layer of powder and binder material corresponding to the cross-section of the part being built, and control the energy source to solidify the binder material in the combined layer in accord with the pattern.

A third dispensing system may be configured to deliver a densification material to the layer of powder or the combined layer of powder and binder material. The densification material may have a same composition as the powder but have a smaller mean diameter. The third dispenser system may include a first densifier dispenser configured to selectively dispense the densification material onto the build area. The first densifier dispenser may include a plurality of individually controllable orifices, each orifice of the plurality of orifices of the first densifier dispenser configured to controllably deliver the densifying material.

The first densifier dispenser may be attached to and moves with the first support. The first binder material dispenser and energy source may be attached to and move with the first support, or attached to and move with a second support from the one or more supports. The first support may be movable along a first axis, and wherein the second support is movable parallel to the first axis independently of the first support. The first support may be movable along a first axis, and the second support may be movable perpendicular to the first axis independently of the first support. The first support may be movable along a first axis, the second support may be movable along a second first axis independently of the first support, and the first binder material dispenser may be configured to selectively dispense the binder material in a strip along an axis that is at a non-zero angle relative to the second axis.

The first densifier dispenser may be attached to and moves with a second support from the one or more supports, and the second support may be movable along a third axis. The first densifier dispenser may be configured to selectively dispense the densifier material in a strip along a fourth axis that is at a non-zero angle relative to the third axis. The third axis may be substantially parallel to the first axis. The first binder material dispenser and energy source may be attached to and move with the second support.

The first binder dispenser and first densifier dispenser may be configured such that the first binder dispenser is positioned before the first densifier dispenser along the direction of motion. The first binder dispenser and first densifier dispenser may be configured such that the first binder dispenser is positioned after the first densifier dispenser along the direction of motion.

The third dispenser system may include a second densifier dispenser configured to selectively dispense the densification material onto the build area. The first densifier dispenser and second densifier dispenser may be attached to and move with the first support. The first densifier dispenser may be attached to and move with a second support from the one or more supports and the second densifier dispenser may be attached to and move with a third support. The first binder dispenser and energy source may be attached to and move with a fourth support from the one or more supports. The densification material may have a same material composition as the powder but a smaller mean diameter particle size.

A fourth dispenser system may be configured to dispense a plurality of successive layers of a second powder onto the build area, wherein the fourth dispenser system comprises a second powder dispenser that is configured to selectively dispense the second powder onto the build area. The second powder may differ in composition from the first powder. The first powder may include metallic particles and the second powder may include ceramic or plastic particles. The first powder may include ceramic particles and the second powder include plastic particles. The second powder may have a same material composition as but a different size distribution than the first powder.

The second powder dispenser may include a plurality of individually controllable orifices, each orifice of the plurality of orifices of the second powder dispenser configured to controllably deliver the second powder. The second powder dispenser may be attached to and move with the first support. The first binder dispenser and the energy source may be supported by the first support, or may be supported by and movable with a second support from the one or more supports. The second powder dispenser may be supported by and movable with a second support from the one or more supports.

The second support may be movable along a third axis, and the second powder dispenser may be configured to selectively dispense the second powder in a strip along a fourth axis that is at a non-zero angle relative to the third axis. The first binder material dispenser and energy source may be attached to and move with the second support, or attached to and move with a third support from the one or more supports. The third axis may be substantially parallel to the first axis. The fourth axis may be substantially parallel to the second axis. The fourth axis may be perpendicular to the third axis. The first powder dispenser and second powder dispenser may be configured such that the first powder dispenser is positioned before the second densifier dispenser along the direction of motion. The third axis may be substantially perpendicular to the first axis. The first support and second support may be movable on a same guide rail, or movable on separate parallel guide rails.

A controller may have a memory configured to store a data object that corresponds to at least a layer of an object to be fabricated, and the controller may be configured to cause the first dispenser system to dispense the first powder in a region corresponding to the object to be fabricated, and cause the fourth dispenser system to dispense the second powder in a region that does not correspond to objects to be fabricated.

The first powder may include metal particles and the second powder may include ceramic particles. The first powder may include metal or ceramic particles and the second powder may include plastic particles. The controller may be configured cause the first dispenser system to dispense binder material on only the first powder. The controller may be configured cause the first dispenser system to dispense binder material on both the first powder and the second powder.

A controller having a memory configured to store a data object that corresponds to at least a layer of an object to be fabricated, and the controller configured to cause the first dispenser system to dispense the first powder in a first region corresponding to the object to be fabricated, cause the fourth dispenser system to dispense the second powder in a portion of the first region. The second powder may include a densification material for the first powder.

The first dispenser system may include a second powder dispenser to dispense the first powder and the second dispenser system may include a second binder material dispenser to dispense the binder material. The first powder material dispenser, second powder material dispenser, first binder material dispenser and second binder material dispenser may be attached to and move with the first support. The first binder material dispenser, second binder material dispenser, and energy source may be are attached to and move with a second support, and the second binder material dispenser is attached to and moves with a third support. The first support, second support and third support may be independently movable along the first axis. Along the third axis the first powder dispenser, first binder material dispenser, energy source, second binder material dispenser and second powder dispenser may be arranged in the aforementioned order.

A controller may have a memory configured to store a data object that identifies a pattern in which the binder material is to be solidified in a successive layers of an object to be fabricated, and the controller may be configured to cause the first powder dispenser to dispense a first layer of powder as the first powder dispenser moves in a first direction along the first axis, cause the first binder dispenser to dispense a first layer of binder material on the first layer of powder to provide a first combined layer of powder and binder material as the first binder material dispenser moves in the first direction along the first axis, control the energy source to solidify the binder material in the first combined layer in accord with the pattern, cause the second dispenser system to dispense a second layer of powder as the second powder dispenser moves in a second direction opposite to the first direction along the first axis, cause the second binder dispenser to dispense a second layer of binder material on the second layer of powder to provide a second combined layer of powder and binder material as the second binder dispenser moves in the second direction, and control the energy source to solidify the binder material in the second combined layer in accord with the pattern.

The light source may be configured to illuminate a stripe along of the uppermost layer. The energy source may be coupled to a support from the plurality of supports, and the support may be movable along an axis at a non-zero angle, e.g., a right angle, relative to the stripe to sweep the stripe across the build area. The energy source may include a plurality of independently controllable light sources. The light sources may be light emitting diodes (LEDs). The light sources may be UV or IR light sources.

An oven may sinter a green part fabricated on the platform. A robot may transfer the green part from the platform to the oven. An etching system may etch away the binder material. A sealed housing may form a chamber enclosing the platform, one or more supports, first dispenser system, second dispenser system and energy source. A pump may evacuate the chamber. A gas supply may provide a gas that is inert to the first powder and the first binder material.

In another aspect, a method of fabricating a green part includes successively forming a plurality of layers of the green part by, for each layer, selectively dispensing a layer of powder onto a build area on a platform, wherein the selective dispensing covers less than all of the build area, selectively dispensing a binder material onto the layer of powder to form a combined layer of powder and binder material, and directing radiation toward the platform so as to solidify the binder material to form a layer of the plurality of layers of the green part in which the powder is held by the solidified binder material.

Implementations may include one or more of the following features. The green part may be removed from the platform and processed to form the powder into solid mass. Processing comprises one or more of annealing, sintering, and/or hot isostatic pressing.

Selectively dispensing the layer of powder may include dispensing powder from a plurality of independently controllable nozzles of a powder dispenser while the powder dispenser moves along a first axis. The nozzles are arranged along a second axis at a non-zero angle, e.g., a right angle, relative to the first axis.

Selectively dispensing the binder material may include dispensing binder material from a plurality of independently controllable nozzles of a binder material dispenser while the binder material dispenser moves along a third axis. The nozzles may be arranged along a fourth axis at a non-zero angle relative to the third axis. The third axis may be parallel or perpendicular to the first axis. The fourth axis may be perpendicular to the third axis.

Radiation may be directed toward the platform by delivering energy along a stripe that is parallel to the fourth axis. A constant distance may be maintained between the third axis and the stripe of radiation during processing of a layer. Maintaining the constant distance may include securing the binder material dispenser and a light source to a same support. Directing radiation toward the platform may include selectively delivering energy along the stripe.

Selectively dispensing the layer of powder may include determining a perimeter of a cross-sectional area covered by the part, determining a buffer zone surrounding the perimeter of the cross-sectional area, and dispensing powder into regions that overlap the cross-sectional area and buffer zone. Selectively dispensing the layer of powder may include determining a retaining wall region surrounding the buffer zone, and dispensing powder into regions that overlap the cross-sectional area, buffer zone and retaining ring area. Binder material can be refrained from being dispensed to the buffer zone. Powder can be refrained from being dispensed outside the regions that overlap the retaining ring area. The layer of powder may be dispensed from a first dispenser, the binder material may be dispensed from a second dispenser, and the radiation may be generated from an energy source, and the first dispenser, second dispenser and energy source may be lifted by a height approximately equal to a thickness of the layer after each layer is processed.

Particular embodiments of the subject matter described in this specification can be implemented so as to realize one or more of the following advantages. Selective material dispensing in additive manufacturing can reduce feedstock wastage and contamination, and can improve manufacturing efficiency. The presence of densification material can increase product rigidity and reduce product shrinkage during post-processing.

The details of one or more implementations of the subject matter described in this specification are set forth in the accompanying drawings and the description below. Other potential features, aspects, and advantages will become apparent from the description, the drawings, and the claims.

DETAILED DESCRIPTION

In current dry powder additive manufacturing apparatus for forming green parts, the powder dispenser system spreads powder across the entire build area during operation. For example, such an apparatus can employ rollers or blade recoaters to push a pool of feed materials across the build area. As a result, powder is distributed to regions of the build area that do not correspond to the part being fabricated.

The excessive usage of powder, however, causes several drawbacks on both product quality and manufacturing efficiency. In particular, a significant portion of powder is wasted, increasing part cost. Recycling of powder may be impractical, expensive, or lead to poor part quality. For example, recoating using reclaimed powder significantly increases the chances of powder contamination. Examples of powder contamination include but are not limited to binder material contamination, sintering contamination, oxygen contamination, etc. Contaminated powder particles have direct impact on the final part's quality. Furthermore, powder has to be applied to areas where actual printing does not occur, thus slowing down the system's overall print speed and/or throughput.

A technique to address some of these issues is to use a binder-jetting additive manufacturing apparatus in which powder can be selectively delivered over the build area. Such an apparatus can reduce powder usage, increase the efficiency of printing, and reduce the possibility of powder contamination.

The powder dispenser system can employ an array of individually controllable nozzles. As the powder dispenser moves across the platform, the powder dispenser nozzles can be independently activated to dispense powder only at selected locations on the platform.

Furthermore, binder-jetting processes often result in low compaction of the green part and hence excessive shrinkage during post-processing. The presence of binder material particles between the powder particles further creates space for potential source of defects during post-processing. However, an additive manufacturing apparatus can include densification materials in binder formula to reduce the voids between dispensed particles in a layer. The densification materials can also serve as nucleation site during post-processing to improve the strength of the final product.

An additive manufacturing apparatus can be made in different configuration to improve printing efficiency.

The additive manufacturing apparatus includes at least a platform that provides a build area on which the part is to be fabricated, a powder material dispenser, a binder material dispenser, and an energy source to deliver energy to cure the binder material. The powder material dispenser, binder material dispenser, and energy source can be held by one or more supports above the platform.

Figure 1A:
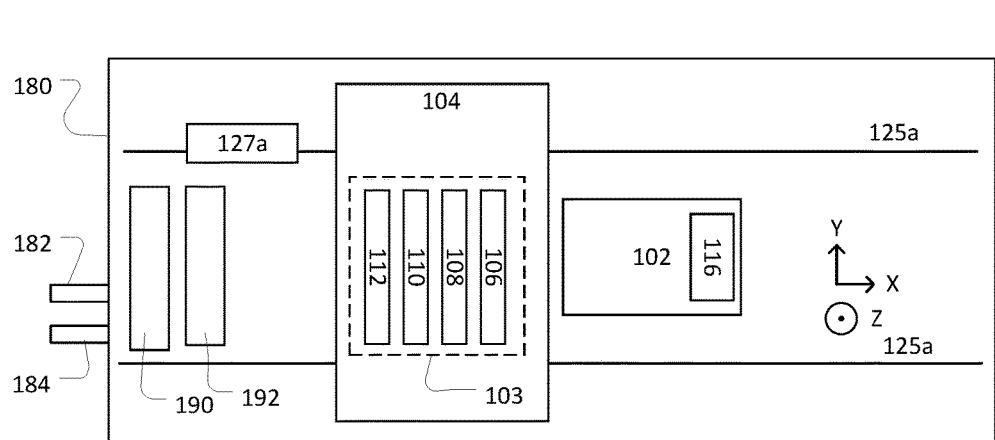
FIGS. 1A-B each shows a schematic top view of an implementation of an addictive manufacturing apparatus.

FIG. 1A shows an example of the top view of an additive manufacturing apparatus 100. The additive manufacturing apparatus 100 includes a platform 102 that provides a build area on which the part is to be fabricated, a support 104 positioned above the platform 102, and a printhead assembly 103 mounted on the support 104.

The various components, e.g., platform 102, support 104 and printhead assembly 103, can be enclosed in a sealed housing 180 that provides a controlled operating environment. The housing 180 can include an inlet 182 coupled to a gas source, e.g. Ar, or $N_2$, and an outlet 184 coupled to an exhaust system, e.g., a pump. This permits the pressure and oxygen content of the interior of the housing 180 to be controlled. For example, oxygen gas can be maintained below 50 ppm when dealing with Ti powder particles.

The additive manufacturing apparatus can include other features, e.g., a service station 190 to purge and/or clean various components of printhead assembly 103, or a powder charging station 192 to reload the dispensers in the printhead assembly 103. These stations can also be positioned inside the housing 180.

The printhead assembly 103 includes one or more printheads, each configured to be independently removably secured to the support 104. Each printhead can include one or more mechanisms to dispense a powder material, a binder material, and/or a densification material. One of the printheads, e.g., the printhead that includes a dispenser for the binder material, can also include a mechanism to deliver energy to cure the binder material. Alternatively or in addition, a mechanism to deliver energy can be mounted directly to the support 104.

Figure 1B:
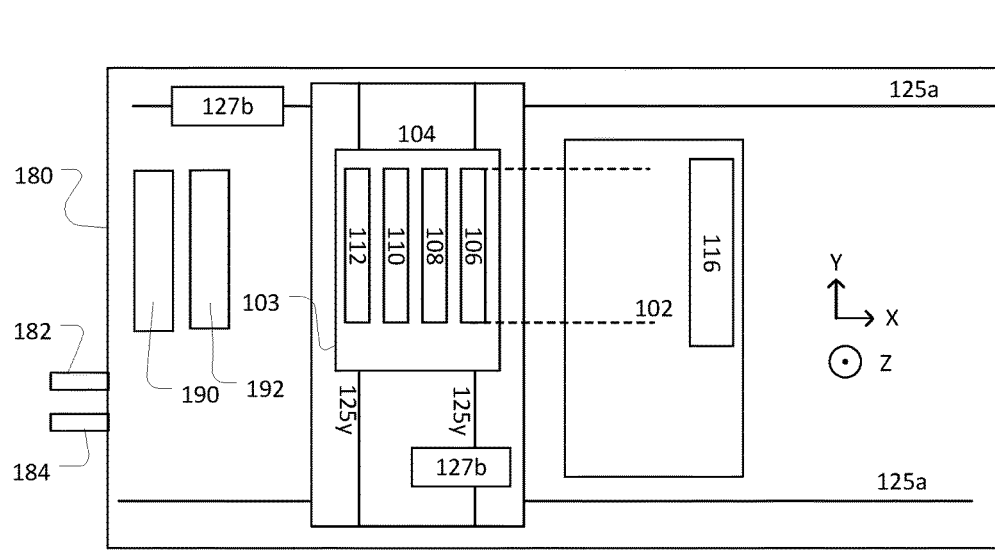
Figure 1C:
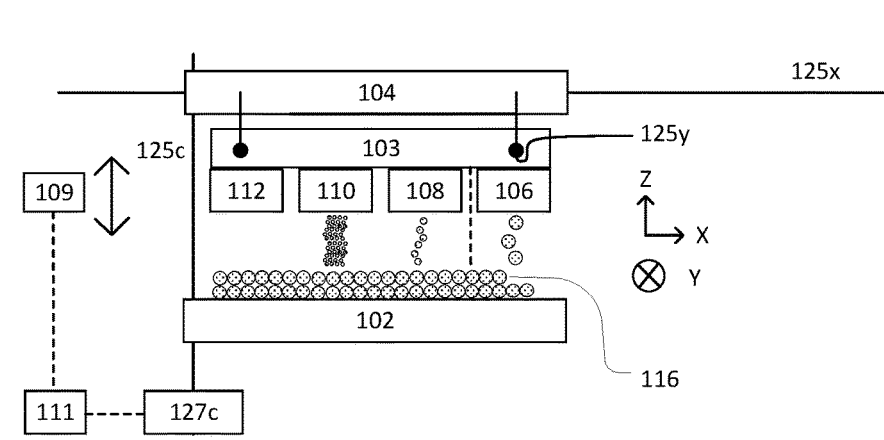
FIG. 1C shows a schematic side view of an addictive manufacturing apparatus, e.g., the additive manufacturing apparatus of FIG. 1A.
Figure 1D:
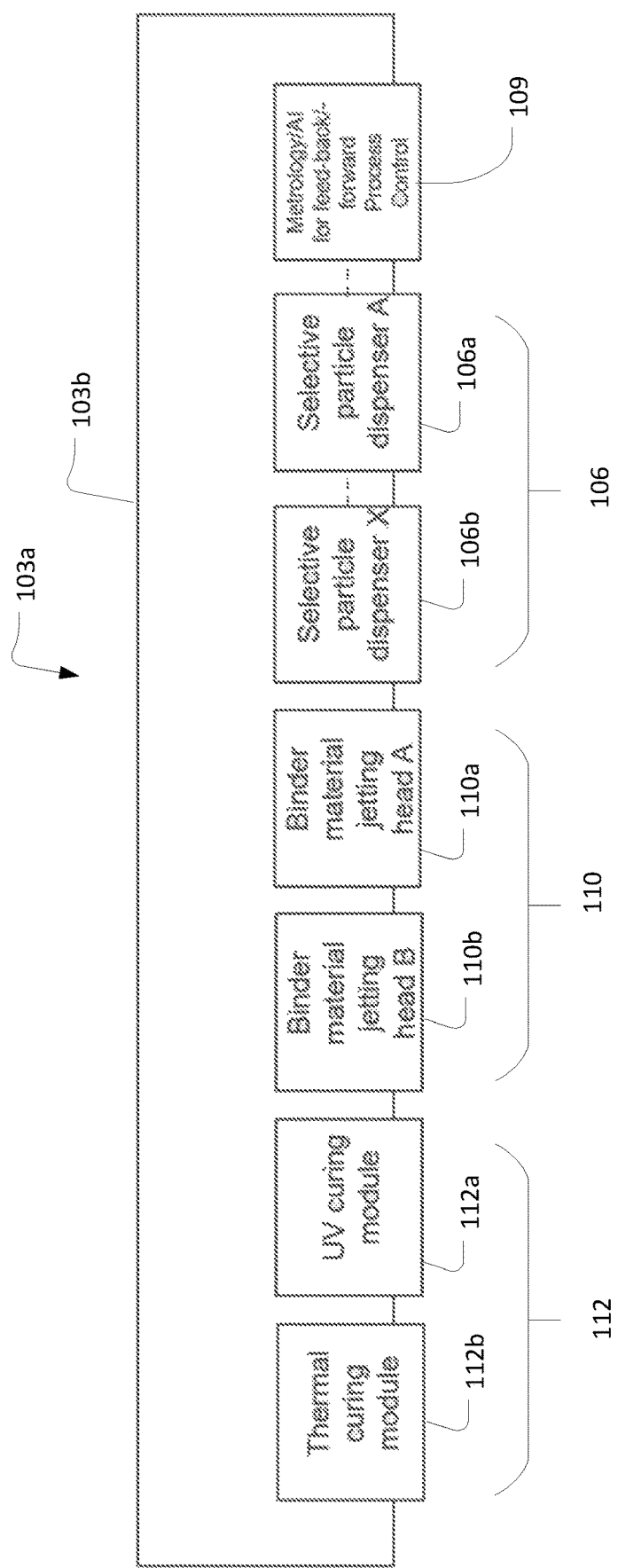
FIG. 1D shows a schematic side view of an implementation of a printhead assembly.

For example, FIG. 1D shows a schematic example of a printhead 103a. The printhead 103a includes a sensor 109 for a metrology system, one or more powder dispensers 106 (e.g., two powder dispensers 106a and 106b), one or more binder material dispensers 110 (e.g., two binder material dispenser 110a and 110b), and one or more energy delivery systems 112 (e.g., two energy delivery systems 112a and 112b). The components are mounted to a common frame 103b, and the frame 103b can be removably mounted on the support 104. This permits the printhead 103a with the various components to be attached and detached as a unit from the support 104. Although FIG. 1D illustrates the components as being suspended below the frame 103b, this is not necessary; the frame 103b could simply be a plate with apertures into which the components fit.

Returning to FIG. 1A, the support 104 is movable relative to the platform 102 so that the printhead assembly 103 is movable over the build area. The additive manufacturing apparatus 100 includes one or more actuators 127a. The actuators 127a are operable to create relative motion between the support 104 and the platform 102, e.g., along the X-axis, such that the support 104 and the printhead assembly 103 can scan across the platform 102. For example, one or more rails 125a can be arranged adjacent the platform 102 and extending along an X-axis, and the support 104 can be supported on and movable along the rails 125a by the actuators 127a. Where two rails are used, the rails 125a can be on opposite sides of the platform 102. For example, the support 104 can be a gantry supported on two opposite sides, e.g., by two rails 125a, 125b, as shown in FIG. 1A. Alternatively, the support 104 can be held in a cantilever arrangement on a single rail.

In some implementations, the support 104 and the platform 102 can be configured to be immobile relative to each other along the Y-axis. Alternatively, one or more actuators 127b can be used to create relative motion between the support 104 and the platform 102 along the Y-axis, e.g., as shown in FIG. 1B.

As shown in FIG. 1A, the printhead assembly 103 supports a powder dispenser 106, a densification material dispenser 108, a binder material dispenser 110, and an energy delivery system 112. Each of these printheads is placed in a fixed position on the support 104 and relative to each other. The printheads can be positioned in the printhead assembly 103 such that the printhead assembly 103 can finish printing one layer of material in a single motion. For example, along the direction of motion, e.g., the x-axis, the powder dispenser 106 can be placed before the densification material dispenser 108 and the binder material dispenser 110, and the energy delivery system 112 can be placed after the densification material dispenser 108 and the binder material dispenser 110. As a result, the printhead assembly 103 can complete printing of one layer in a single sweep in one direction across the build area.

The densification material dispenser 108 is optional, so in some implementations and the printhead assembly includes only the powder dispenser 106, the binder material dispenser 110, and the energy delivery system 112.

In some implementations, the dispensers 106, 110 and energy delivery system 112 can be directly mounted to the support 104.

In some implementations, each of the respective printheads can be positioned, relative to the platform 102 to deliver materials along a respective line at a respective non-zero angle, e.g., at a right angle, relative to the direction of motion of the support 104. The material can be delivered by two or more of the printheads along parallel lines. For example, where the support 104 and printhead assembly 103 are moving along the X axis, each printhead can deliver material along a line along the Y-axis.

The printheads can be configured to deliver materials along a line that spans the entire build area of the platform 102. For example, in some implementations (e.g., shown in FIG. 1A), each printhead spans the entire build area. Alternatively, the printhead assembly can include multiple printheads arranged in two or more columns to form a staggered array such that each of the printheads spans across the entire platform 102 along the Y-axis.

The energy delivery system 112 includes an energy source, e.g., light source, that generates and directs radiation toward the combined layer of powder and binder material. If the binder material is liquid, the energy source can cure the binder material to solidify the binder material. This can form a body having the powder suspended in a cured matrix of binder material. The radiation from the energy delivery system can include UV light, IR light and/or visible light.

In some implementations, the energy source is configured to illuminate a strip that extends across a width of the build area, and to move the illuminated strip across the length of the build area to sweep the radiation beam across the entire build area. The strip can extend at a non-zero angle, e.g., perpendicular, to the direction of motion of the strip. In some implementation, the energy source is secured to and moves with a support, and the relative motion between the support and the platform causes the strip of light to sweep across the build area. Alternatively, a light beam can be deflected from a rotatable mirror, and rotation of the mirror can move the strip of light.

In some implementations, the energy delivery system includes a plurality of light sources that can be independently activated. Each light sources can be arranged in an array, e.g., a linear array, so as to provide selectable illumination along the primary axis of the strip. The energy sources can include, for example, light emitting diodes (LEDs), configured to emit radiation having an intensity dependent on a current delivered to the LEDs. The energy sources can also include, for example, an array of lasers, e.g., laser diodes, an array of lamps, e.g., mercury lamps, that provide wide spectrum irradiation, or a solid-state infrared emitter array.

In some implementations, the energy sources are arranged such that each radiation beam is directed toward a different voxel of the layer. In some implementations, the energy sources are arranged such that each radiation beam is directed toward a different region of the layer, with the regions being larger than the voxels provided by the binder material dispenser.

In some implementations, the actuator 127a causes relative motion between the platform 102 and the support 104 such that the support 104 advances in a forward direction relative to the platform 102. The powder dispenser 106, densification material dispenser 108, and the binder material dispenser 110 can be positioned on the support 104 ahead of the energy delivery system 112 so that the recently dispensed powder 116 can be subsequently cured by the energy delivery system 110 as the support 104 is advanced relative to the platform 102.

In some implementations, the platform 102 is positioned on a conveyor operable to move the platforms along the X-axis. The actuator 127a can generate linear motion of the conveyor along the X-axis, thereby causing relative motion of the platforms 102 and the support 104.

In some implementations, the apparatus 100 includes multiple platforms 102 arranged in a linear array or two-dimensional array.

In some implementations, the apparatus 100 can includes multiple powder dispensers with each dispenser configured to dispense a different type of powder, e.g., different powders of different material composition. For example, in FIG. 1D, a first powder dispenser 106a can dispense powder comprising metal particles, and a second powder dispenser 106b can dispense powder comprising plastic particles.

In some implementations, apparatus includes multiple powder dispensers configured to dispense powder of the same composition but of different size. For example, in FIG. 1D, the powder dispenser 106a can dispense powder comprising metal particles larger than a first mean diameter, and the powder dispenser 106b can dispense powder comprising metal particles smaller than the first diameter.

In some implementations, the assembly includes multiple binder material dispensers that are configured to dispense different types of binder materials. For example, in FIG. 1D, the binder material dispensers 110a can be configured to dispense a first binder material operable on powder from the powder dispenser 106a, while the binder material dispenser 110b can be configured to dispense a second binder material operable on powder from the powder dispenser 106b.

The binder materials can differ in viscosity, curing wavelength, curing kinetics, and/or wetting behavior. The binder materials can be dispensed from respective binder material dispensers. In some implementations, a first binder material has a sufficiently low viscosity than that the first binder material can infiltrate swiftly through the layer of powder. In contrast, the second binder material can have a higher viscosity than the first binder material, e.g., a sufficiently high viscosity that the second binder material will bridge gaps between particles to improve leveling of the layer. This can facilitate good interlayer adhesion.

In some implementations, the first binder material preferentially wets the powder, and the second binder material preferentially wets the first binder materials.

In some implementations, the first binder material cures more quickly than the second binder material under normal radiation conditions. This permits the first binder material to quickly fix the powder in place, and the second binder material to hold the powder more securely. In some implementations, the second binder material can be cured during application of energy to a subsequently deposited layer.

FIG. 1B shows another example of an additive manufacturing apparatus 100. The implementation shown in FIG. 1B is similar to the implementation shown in FIG. 1A, but in FIG. 1B, the printheads 106-110 and energy delivery system 112 mounted on the support 104 do not extend along the entire width of the platform 102. For example, in FIG. 1B, the width of the powder dispenser 106 is shorter than the width of the platform 102. As a result, the printhead assembly 103 is configured to be movable relative to the platform 102 along an axis, e.g., Y-axis, that is at a non-zero angle, e.g., at a right angle, to the primary direction of motion of the support 104. This permits the dispensers to cover the entire build area of the platform 102. The printhead assembly 103 can be movably mounted to the support 104 so that each component can be repositioned to dispense material or deliver energy across the entire width of the platform 102. In some implementations, one or more actuators 127b positioned on the support 104 and operable to move the components of the printhead assembly 103 on the rails 125b along the Y-Axis relative to the support 104 and to the platform 102.

In some implementations, the powder dispenser 106 can extend, e.g., along the Y-axis, using the actuator 127b and along the rails 125y, such that powder particles 116 are dispensed along a line, e.g., along the Y-axis, that is perpendicular to the direction of motion of the support 104, e.g., perpendicular to the X-axis. Thus, as the support 104 advances along the direction of motion, powder particles 116 can be delivered across the entire platform 102.

FIG. 1C shows an example of the side view of the additive manufacturing apparatus 100. The additive manufacturing apparatus 100 can include a sensing system 109, e.g., to detect a height of the platform 102 or the height of the top surface of the layers of powder 116. For example, the sensing system 109 can include one or more optical sensors, e.g. to measure a height of the topmost layer of powder 116 relative to bottom surface of the printhead assembly 103.

The apparatus 100 can also include a controller 111 configured to selectively operate the actuator 127c to create relative vertical motion (i.e. along the Z-axis) between the printhead assembly 103 and the platform 102. For example, the relative vertical motion can be achieved by moving the platform 102 or the support 104 along the rail 125c along the Z-axis. In particular, for heavy metal parts, the support 104 can be moved while the platform 102 remains stationary.

The controller 111 can be linked to the sensing system 109 such that the controller 111 uses data from the sensing system 109 to determine the appropriate height adjustment. For example, after each layer of powder 116 is dispensed, the sensing system 109 determines the new distance between the top surface of the layer of powder 116 and the bottom surface of the printhead assembly 103. The controller 111 receives this data and uses the actuator 127c to raise the support 104 by the appropriate height equal to the height of the layer of the powder 116. Consequently, the apparatus 100 can maintain a constant height offset between the top surface of the layer of powder 116 and the printhead assembly 103 from layer-to-layer.

In some implementations, the relative motion between the printhead assembly 103 and the platform 102 can be incremental or continuous. For example, the printhead assembly 103 can be moved relative to the platform 102 between sequential dispensing operations, between sequential curing operations, or both. Alternatively, the printhead assembly 103 can be moved continuously while the powder 116 is dispensed and is cured.

In some implementations, the additive manufacturing apparatus 100 can include multiple supports, and each support can mount one or more printheads or the energy delivery system. In some implementations, where multiple supports are used, each of the supports can be independently moveable in parallel.

Figure 2A:
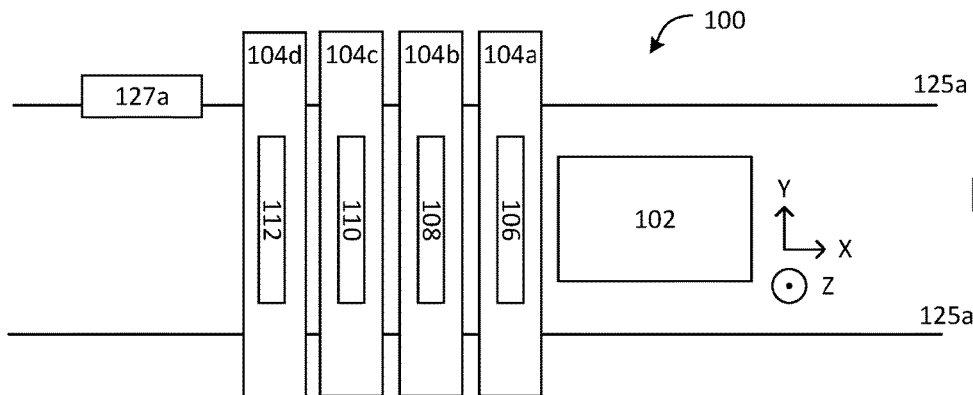
FIGS. 2A-2C each shows a schematic top view of an implementation of an additive manufacturing apparatus.

FIG. 2A gives an example of a top view of another implementation of an additive manufacturing apparatus 100. In FIG. 2A, the apparatus 100 includes four supports 104a-104d. The powder dispenser 106 is mounted on the support 104a. The densification material dispenser 108 is mounted on the support 104b. The binder material dispenser 110 is mounted on the support 104c. The energy delivery system 112 is mounted on the support 104d.

In some implementations, each of the supports is independently moveable in parallel, e.g., along the Y-axis. For example, the support can be coupled to and moveable along the same rail, e.g., the rail 127a, by respective actuators. Alternatively, each of the supports can be coupled to different rails and can move independently and parallel to each other.

Figure 2B:
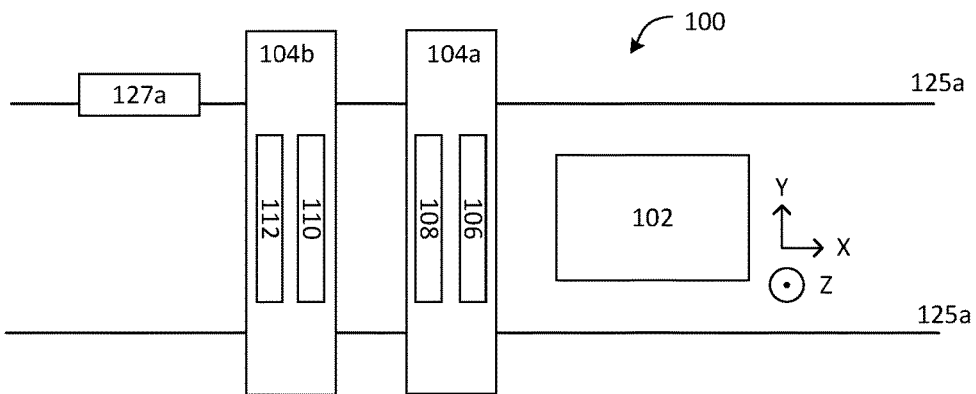

In some implementations, some but not all components can be mounted on the same support. For example, in FIG. 2B, the powder dispenser 106 and the densification material dispenser 108 are mounted on the same support 104a in fixed position relative to each other and to the support 104a. The energy delivery system 112 and the binder material dispenser 110 are mounted on a separate support 104b in fixed position relative to each other and to the support 104b.

As another option, the densification material dispenser 108, binder dispenser 110 and energy source 112 could be mounted on the same support, and the powder dispenser 106 could be mounted on a separate support.

In some implementations, supports 104a-104d can be coupled to the same rail 125a. Alternatively, the supports can be coupled to different rails and can move independently and parallel to each other.

Figure 2C:
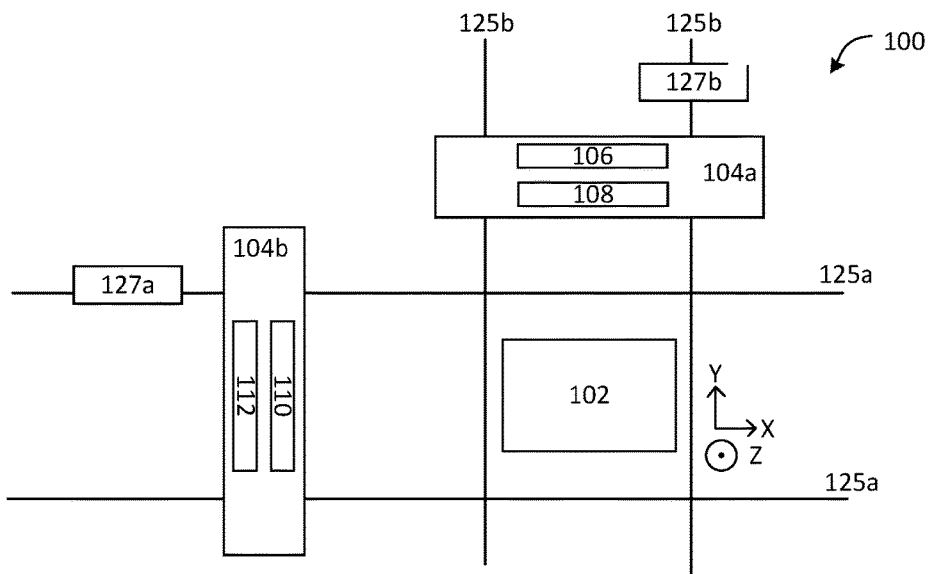

In some implementations, one or more printheads can be mounted on different supports that move perpendicular to each other. For example, in FIG. 2C, support 104b moves in the X-axis along rails 125a, while support 104a moves in the Y-axis along rails 125b. In this case, each printhead on support 104b can deliver material along a line that is at right angle to the line along which material is delivered by each printhead on support 104a.

In some implementations, the additive manufacturing apparatus can include multiple printheads of the same type (e.g., powder delivery, densification material delivery or binder material delivery). This can permit the apparatus to operate in a bi-directional mode.

Figure 3A:
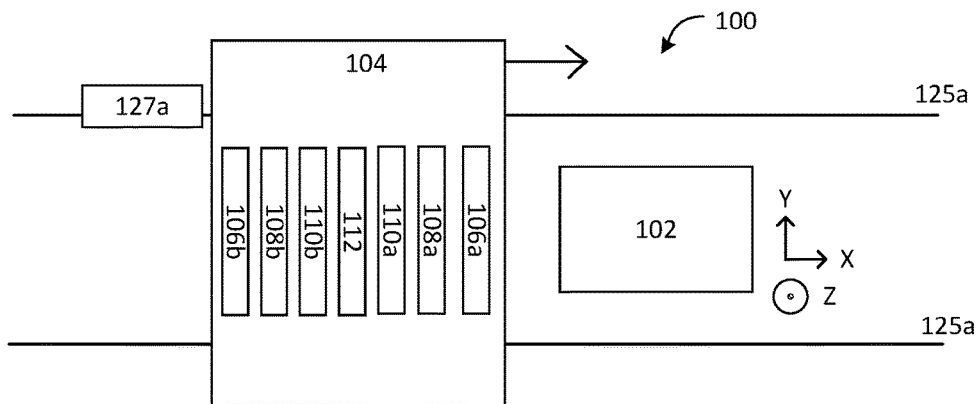
FIGS. 3A-3E each shows a schematic top view of an implementation of an additive manufacturing apparatus.

FIG. 3A shows an example of a top view of the additive manufacturing apparatus 100 with six printheads mounted on the single support 104 in fixed positions relative to each other. The energy delivery system 112 is positioned between the two binder material dispensers 110a and 110b, the two binder material dispensers are positioned between the two densification material dispensers 108a and 108b, and the two densification dispenser are positioned between two powder dispensers 106a and 106b. Alternatively, the positions of the densification dispensers 108a, 108b and the binder material dispensers 110a, 110b can be swapped. The actuator 127a can create relative motion between the support 104 and the platform 102 along the X-axis. For example, the support 104 can be movably coupled to the rails 125x.

As shown in FIG. 3A, as the support 104 moves across the platform 102 in the positive X-direction in a first scanning motion, the powder dispenser 106a, the densification material dispenser 108a, and the binder material dispenser 110a can sequentially deposit respective materials on the platform 102 to form a first layer of material matrix. Since the powder dispenser 106a, the densification material dispenser 108a, and the binder material dispenser 110a are all positioned in advance to the energy delivery system 112, the energy delivery system 112 can subsequently cure this first layer of material to form a first layer of the green part. After this scanning motion, the support 104 will stop at a new position relative to the platform 102 as shown in FIG. 3B.

Figure 3B:
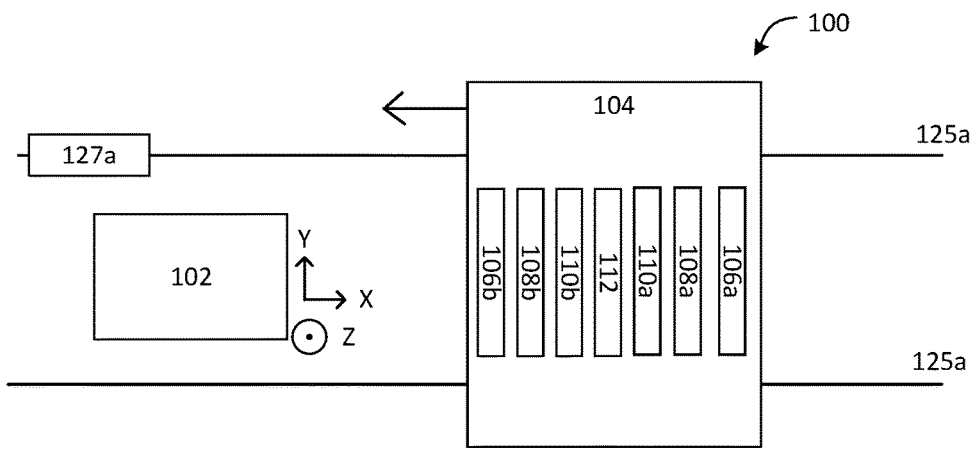

As shown in FIG. 3B, the support 104 then moves in the opposite direction, i.e., the negative X-direction, to return to the initial location as shown in FIG. 3A. The powder dispenser 106b, the densification material dispenser 108b, and the binder material dispenser 110b can sequentially deposit respective materials on the platform 102 to form a second layer of material. The energy delivery system 112 can then cure this second layer of material to form a second layer of the green part. As a result, when the support 104 returns to its initial position relative to the platform, two layers of materials have been deposited and cured.

In some implementations, the printheads can be mounted on the support 104 such that the densification material dispenser 108a and the binder material dispenser 110a are positioned before the energy delivery system 112 and after the powder dispenser 106a. The densification material dispenser 108b and the binder material dispenser 110b are positioned before the powder dispenser 106b and after the energy delivery system 112. The positions of the densification material dispensers and the binder material dispensers are interchangeable.

Figure 3C:
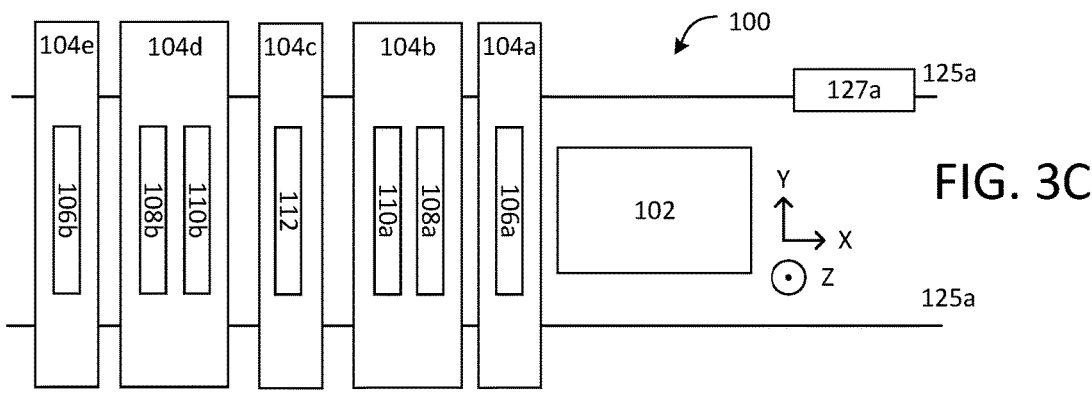

In some implementations, the apparatus 100 can include multiple supports each holding one or more printheads as shown in FIG. 3C. On each support that holds more than one printhead, the printheads can be positioned in accordance with the arrangement disclosed in FIG. 3B.

Figure 3D:
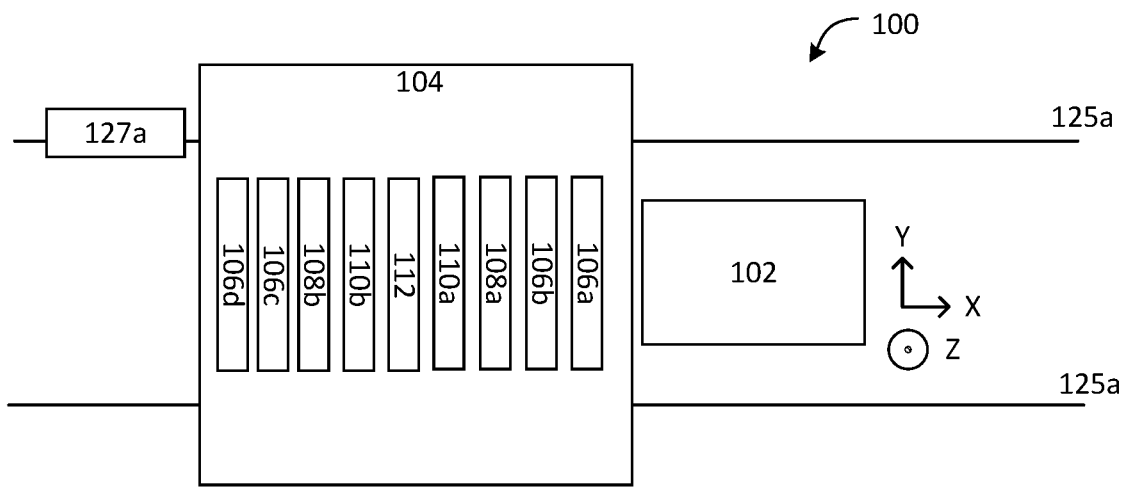

In some implementations, the apparatus 100 can includes multiple pairs of powder dispensers, with the two pairs configured to dispense a different type of powder. For example, as shown in FIG. 3D, the apparatus 100 can include a first pair of powder dispenser 106a and 106d, and a second pair of powder dispenser 106b and 106c. The second pair of powder dispensers 106b, 106c is positioned between the first pair of powder dispensers 106a, 106d. Again, this can permit the apparatus to operate in a bi-directional mode.

For example, in FIG. 3D, the powder dispensers 106a and 106d can dispense a first powder of a first material composition, e.g. a powder comprising metal particles, and the powder dispenser 106b and 106c can dispense powder of a different second material composition, e.g., a powder comprising plastic particles.

In some implementations, the multiple powder dispensers are configured to dispense powder of the same material composition but of different size. For example, in FIG. 3D, the powder dispensers 106a and 106d can dispense a first powder of a first material composition and falling within a first size range, e.g., larger than 100 nanometers, and the powder dispenser 106b and 106c can dispense a second powder of the same material composition but falling within a different second size range, e.g., smaller than 100 nanometers. The size ranges can be non-overlapping.

Figure 3E:
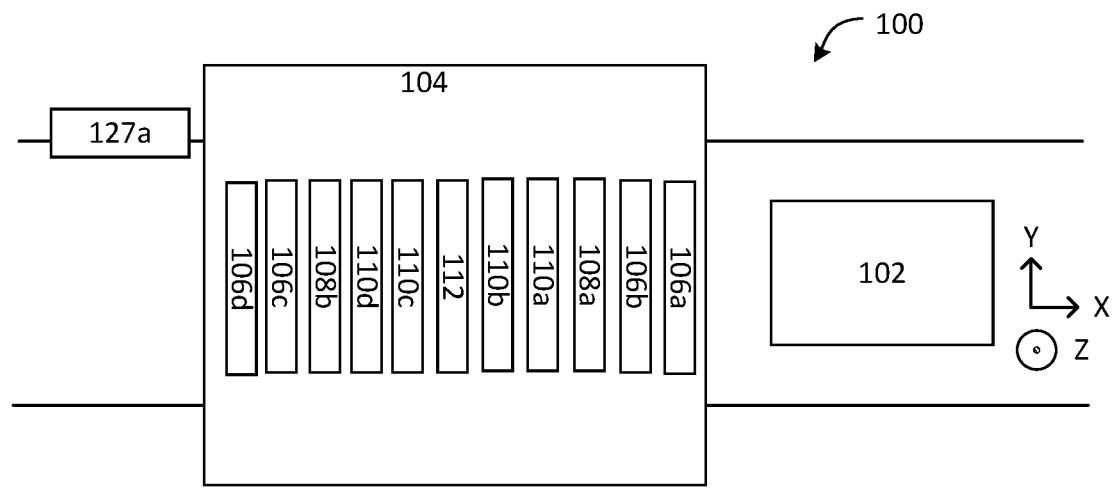

In some implementations, the apparatus 100 can include multiple pairs of binder material dispensers, with the two pairs configured to dispense different types of binder material. For example, as shown in FIG. 3E, the apparatus 100 can include a first pair of binder material dispensers 110a and 110d, and a second pair of binder material dispensers 110b and 110c. The second pair of binder material dispensers 110b, 110c is positioned between the first pair of binder material dispensers 110a, 110d. Again, this can permit the apparatus to operate in a bi-directional mode.

In some implementations, the different pairs of multiple binder material dispensers are configured to dispense different types of binder materials. The binder materials from dispensed from dispensers 110a and 110d can differ in viscosity, curing wavelength, curing kinetics, and/or wetting behavior from the binder material dispensed from dispenser 110b and 110c, for the various reasons discussed above. For example, in FIG. 3E, the binder material dispenser 110a and 110d are configured to dispense binder material operable on powder from the powder dispenser 106a and 106d, respectively, while the binder material dispenser 110b and 110c are configured to dispense binder material operable on powder from the powder dispensers 106b and 106c, respectively.

Although FIGS. 3D and 3E illustrate the various dispensers all on the same support 104, as discussed above, some of the dispensers can be on separately movable supports. For example, the two powder dispensers 106a, 106b could be on a first support, the binder material dispensers 110a-110d and energy delivery system 112 could be on a second support, and the two powder dispensers 106c, 106d could be on a third support. Alternatively, each powder dispenser 106a-106d could be on its own separately movable support. The densification material dispensers 108a, 108b, could be on their own support, or on the support of one of the adjacent dispensers.

FIG. 4 shows an example of the additive manufacturing apparatus 100 fabricating a three-dimensional part, e.g., a green part.

The powder dispenser 106 first dispenses a layer of powder particles 116 onto the platform 102 at desired locations, i.e., it has a lateral spatial resolution. The lateral resolution of the powder dispenser can be worse, i.e., lower, then lateral resolution of the binder material dispenser. For example, binder material dispenser can dispense binder material on a voxel-by-voxel basis to an uppermost layer of powder in the build area to form a volume of the layer having powder and binder material and corresponding to a cross-sectional portion of a part being built. In contrast, the powder dispenser can be configured to selectively dispense the powder on a region-by-region basis, where the regions are larger than the voxels. While there may still be some powder delivered in areas where it is unneeded, this still permits usage of powder to be reduced. In some implementations, the lateral resolution of the powder dispenser is the same, e.g., voxel-by-voxel, as the lateral resolution of the binder material dispenser.

In some implementations, a mechanical roller or blade 401 is employed to subsequently spread and/or compact the thin layer of powder particles 116.

The amount of powder particles 116 required per layer is determined by the controller 111 based on a number of factors, including but are not limited to: the pre-determined layer thickness, the size of the particles, the size of the green part and or the retaining wall, the desired spatial resolution, the effective printing area, etc. The controller 111 has a memory configured to store a data object that identifies a pattern controlling the movement and material dispensing of the printheads.

In some implementations, the densification material dispenser 108 dispenses the densification material 118 at selected locations on the previously spread layer of the powder particles 116. For example, the densification material can be deposited at regions corresponding to the surface of the object being fabricated. The densification material 118 can serve several different purposes. For example, the densification material 118 can help fill the space between the neighboring powder particles 116, thus improving the green part's density, reduced shrinkage and rigidity.

In some implementations, the densification material 118 is or includes a powder of particles. Such densification particles 118 can act as nucleation sites during the post-processing of the green part, resulting in stronger bonding and lower sintering temperature. In some implementations, the densification material 118 comprises particles of similar or identical chemical compositions as that of powder particles 116. In particular, both the powder particles and the particles of the densification material can be ceramic particles. Alternatively, the densification material 118 can comprise particles of varied chemical compositions that act as both densification agents and chemical dopants.

The particles of the densification material 118 can be nano-particles. For example, the particles can have a mean diameter of 10 to 1000 nm, e.g., 50 to 500 nm. In contrast, the powder particles 116 can have a mean diameter between 2 and 100 times, e.g., between 3 and 50 times, between 2 and 10 times, or between 10 and 20 times, larger than the mean diameter of the particles of the densification material 118. In some implementations, the powder particles 110 have a mean diameter between 1 and 500 μm, e.g., between 5 and 50 μm, e.g., between 5 μm and 10 μm, the densification particles have a mean diameter between 10 nm and 10 μm, e.g., between 10 nm and 1 μm, e.g., between 10 nm and 100 nm.

In some implementations, the densification material 118 includes particles mixed with a carrier fluid or gel. For example, the densification material 118 can include nano-particles mixed with a gel, e.g., a sol-gel. The sol-gel can be a precursor for a ceramic material, e.g., the same ceramic material as the powder particles. As another example, the densification material 118 can include nano-particles mixed with a carrier fluid. Alternatively, the densification material 118 can be a liquid.

In some implementations, the densification particles 118 can be mixed with the binder material 120a prior to dispensing. In this case, a single dispenser can deliver a mixture of the binder material and densification particles onto the build area.

A blade and/or roller can be used to obtain a smooth uniform layer prior to the binder material being dispensed and cured. In the case of nano-scale densification agents, a combination of blade and roller can be employed to dislodge, push and spread the densification agent into the layer.

In some implementations, densification particles 118 can be mixed with the binder material 120a prior to dispensing. In this case, a single dispenser can deliver a mixture of the binder material and densification particles onto the build area.

Once a layer 130 of powder particles 116 and densification particles 118 has been spread and compacted on the platform 102, the binder material dispenser 110 can selectively place the binder material 120a onto the layer 130.

Figure 4A:
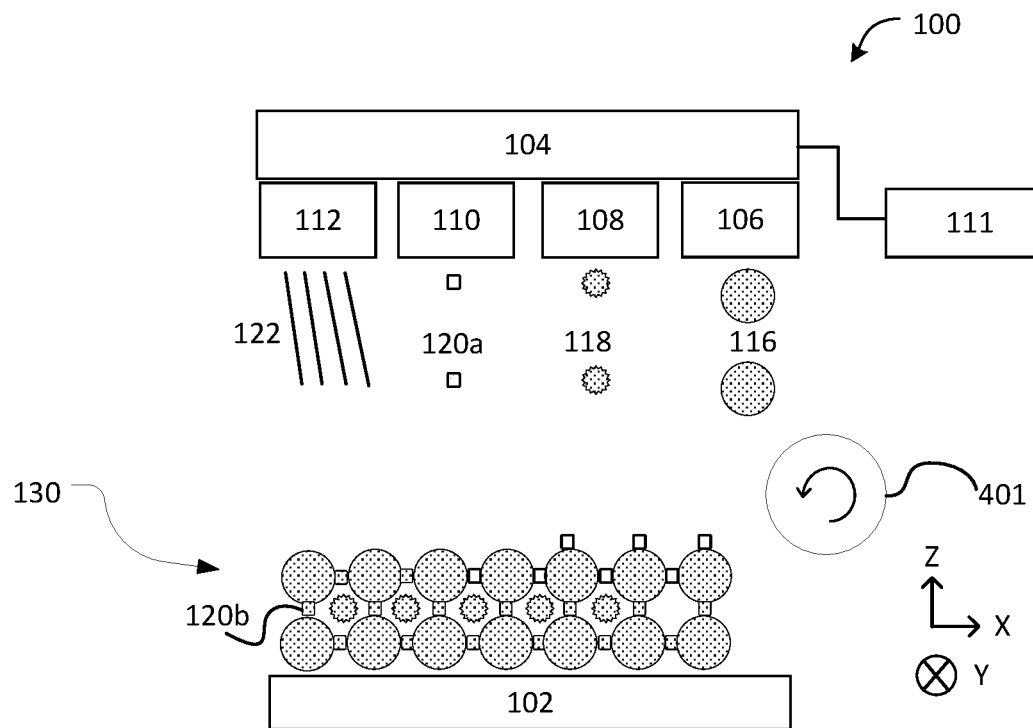
FIG. 4A-B show examples of an additive manufacturing apparatus at work.

As shown in FIG. 4A, the binder material dispenser 110 places the binder material 120a on the layer 130 of powder and densification material.

In some implementations, the binder material dispenser 110 can dispense the binder material 120a via ink-jetting (in which case the binder material can be dispensed in droplets), pipetting, contact transfer, imprint transfer, etc. In some implementations, binder material 120a can infiltrate the space between powder particles 116. In some implementations, the binder material is a liquid. In some implementations, the binder material is solid; in this case the particles of the binder material should be smaller than the powder so that the binder material will infiltrate into the powder.

Once binder material 120a have been placed at the selected locations on the layer 130 of powder particles 116 and densification material 118, the energy delivery system 110 can deliver a radiation beam 122 that causes the binder material 120a to solidify, e.g., polymerize, around both powder particles 116 and optional densification particles 118. This results in the powder particles 116 held in a matrix of binder material 120a.

Examples of radiation beam 122 include, but are not limited to, electron-beam, thermal radiation, UV radiation, IR radiation, monochromatic radiation, microwave radiation, etc. As a result of curing, cured binder material 120b can act as glue to physically couple the neighboring powder particles 116 and 118 together. Cured binder material 120b bonds particles within the same layer, and can bond particles in adjacent layers. In some implementations, the binder material can be formulated to be water-soluble or solvent-soluble. In some implementations, the binder material 120a can be thermal or UV-curable polymers. In some implementations, the binder material 120a can be either colorless or of a specific color.

The successive application of powder particles 116, densification particles 118, binder material 120a, and radiation beam 122 results in the formation of the green part in a pool of loose powder particles 116.

In an apparatus with multiple powder dispensers which can each selectively dispense a respective powder, different powders can be provided for different regions.

Figure 4B:
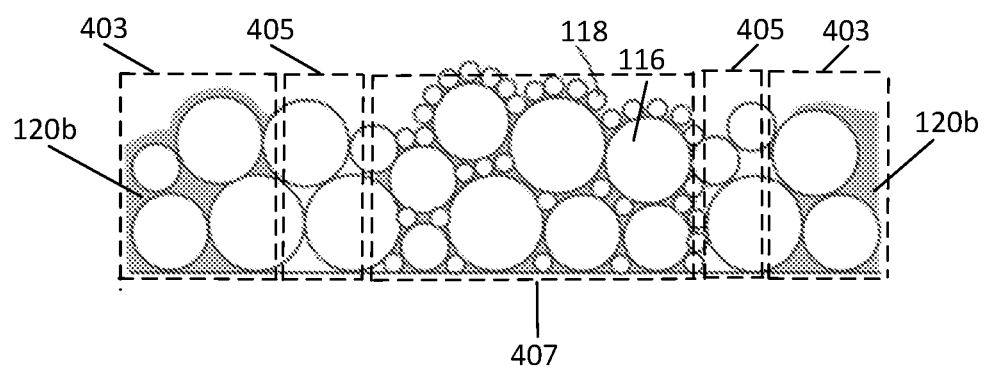

FIG. 4B shows examples of different regions in dispensed layer of powder, binder, and densification materials. For example, powder can be dispensed in a retaining wall region 403 surrounding and separated from the perimeter of the object to be fabricated. This powder is held in place with cured binder material 120b to form a retaining wall 403. The powder in the retaining wall 403 can be of the same or different composition from the composition of the powder used to form the object. For example, if the powder for the green part is a metallic powder, then the powder for the retaining wall can be ceramic powder or plastic powder. As another example, if the powder for the green part is a ceramic powder, then the powder for the retaining wall can be a plastic powder.

The retaining wall 403 surrounds both a green part region 407 containing the layer of the green part being fabricated and a buffer region 405 containing loose powder particles. The loose powder particles are powder particles not bounded by the cured binder material 120b and provide lateral support to prevent the powder in the green part region from slipping laterally. The loose powder particles in the buffer region 405 can also provide vertical support for powder particles in a subsequent layer. The buffer region 405 separates the retaining wall 403 from the green part region 407 to prevent the retaining wall from binding to the part. As a result, the green part can be easily removed from the platform 102 once finished. The powder in the buffer region 405 can be of the same or different composition from the composition of the powder used to form the object. For example, if the powder for the green part is a metallic powder, then the powder for the buffer region can be ceramic powder or plastic powder. As another example, if the powder for the green part is a ceramic powder, then the powder for the buffer region can be a plastic powder. To improve structural rigidity of the part during build, horizontal 'bridges' or 'tethered structures' can be formed by selectively placing binder materials in the buffer regions 405.

Once the green part is formed, it is removed from the platform 102 and the unbound powder particles 116 are recycled by the additive manufacturing apparatus 100 for future use. The green part is then subject to further processing to solidify the powder into a solid mass, and thus increase the density or rigidity of the final product. Examples of green part post-processing include, but are not limited to, sintering and annealing. The presence of densification particles 118 reduces the degree of green part shrinkage during these post-processing steps. The binder material can evaporate or melt away during the subsequent processing.

In some implementations, the powder dispenser 106 and the densification material dispenser 108 are configured to selectively dispense respective particles.

The powder dispenser 106 can include a plurality of nozzles suspended above the platform 102 through which the powder flows. For example, the powder could flow under gravity, or be ejected, e.g., by piezoelectric actuator. Control of dispensing of individual nozzles could be provided by pneumatic valves, microelectromechanical systems (MEMS) valves, solenoid valves, and/or magnetic valves. Other systems that can be used to dispense powder include a roller having controllable apertures, and an auger inside a tube having multiple controllable apertures.

The powder can be a dry powder or a powder in liquid suspension, or a slurry suspension of a material. For example, for a dispenser that uses a piezoelectric printhead, the feed material would typically be particles in a liquid suspension. For example, a dispenser could deliver the powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the particles.

Figure 5A:
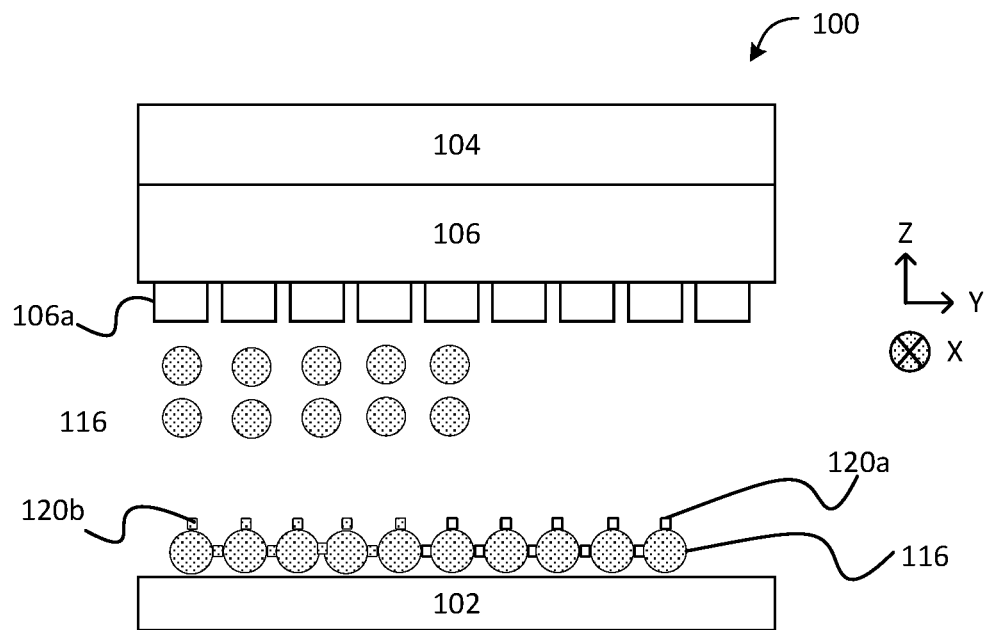
FIG. 5A-B show an example of a powder dispenser selectively dispensing powder.

FIG. 5A shows an example of the powder dispenser 106 configured to selectively dispensing powder particles 116 toward the platform 102. The powder dispenser 106 comprises multiple individually controllable micro dispensers 106a, each capable of dispensing powder particles 116.

The micro dispensers 106a are positioned such that each micro dispenser 106a can dispense powder particles 116 to a corresponding area of the green part to be formed. Such an arrangement of the micro dispensers 106a enables the micro dispensers 106a to selectively dispense multiple powder particles 116 extending along the Y-axis at once without requiring relative motion between the powder dispenser 106 and the platform 102 along the Y-axis.

Figure 5B:
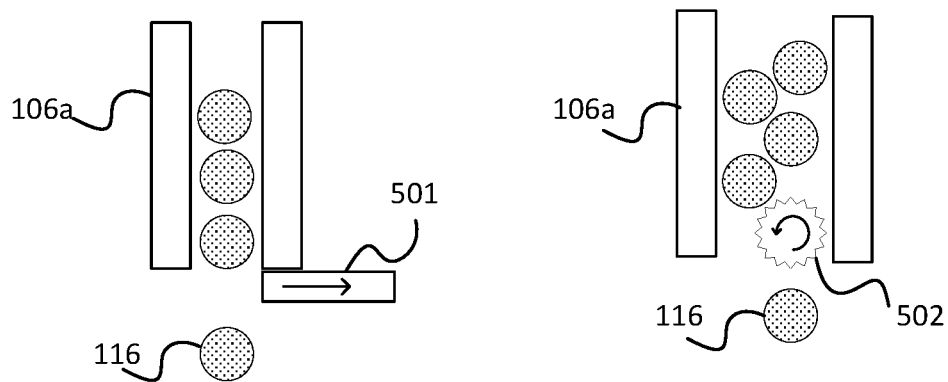

FIG. 5B shows schematic examples of the micro dispenser 106a. For example, the micro dispenser 106a can be controlled by a valve actuator 501 at the dispenser's opening. The valve actuator 501 opens to cause the flow of powder under gravity. In another example, the micro dispense 106a can be controlled by a micro gear 502 at the dispenser's opening. The micro gear 502 can rotate to cause the flow of powder due to the friction force between the micro gear 502 and powder particles 116.

In some implementations, the geometrical shapes of the opening of the micro dispenser 106a can include circle, triangle, elongated slot, square, etc.

As the powder dispenser 106 scans across the platform 102, the micro-dispenser 106a are operated to selectively dispense powder onto the build area. For example, the micro dispensers 106a can be operated to dispense a first set of powder particles 116 along a first column of voxels of the part while the powder dispenser 106 is at a first position along the X-axis, and then dispense a second set of powder particles 116 along a second column of voxels offset from the first set of voxels while the powder dispenser is at a second position along the X-axis. Motion of the powder dispenser 106 can be continuous during dispensing of the powder, or powder dispenser can move in steps between dispensing operations with the powder dispenser being stationary during dispensing to a particular column of voxels.

The array of the micro dispensers 106a extends along the Y-axis, e.g., in a direction perpendicular to the direction of relative motion of the platform 102 and the support 104. In some implementations, the array of the micro dispensers 106a extends across an entire width of the platform 102. The support 104 scans along the X-axis so that the micro dispensers 106a can selectively dispense powder particles 116 across the entire platform 102.

In some implementations, the array of the micro dispensers 106a extends along a direction of motion of the platform 102, e.g., along the X-axis. The micro dispensers 106a are thus capable of dispensing powder particles 116 along the X-axis. As a result, a number of increments of relative motion between the support 104 and the platform 102 along the X-axis to cause the micro dispensers 106a to scan across an entire length of the platform 102 can be decreased.

In some implementations, the array of micro dispensers 106a extends along both the X-axis and Y-axis. For example, the array of micro dispensers 106a can form a rectangular array in which the micro dispensers 106a are arranged in parallel rows and columns. Alternatively, adjacent columns of micro dispensers 106a are staggered relative to one another, or adjacent rows of micro dispensers 106a are staggered relative to one another.

In some implementations, the array of micro dispensers 106a extends along the X-axis and Y-axis such that the array of micro dispensers 106a extends across the platform 102. During relative motion of the platform 102 and the support 104, the platform 102 is positioned relative to the array of micro dispensers 106a such that the build area is beneath the array of micro dispensers 106a and such that the micro dispensers 106a can directly dispense powder particles 116 toward any portion of the build area for the green part.

In some implementations, the binder material dispenser 110 and the densification material dispenser 108 can be configured with architecture similar to the powder dispenser 106 described above, albeit with different materials and dispensing mechanisms (e.g., the binder material dispenser could use a piezoelectric actuator to eject droplets of liquid binder material).

Figure 6:
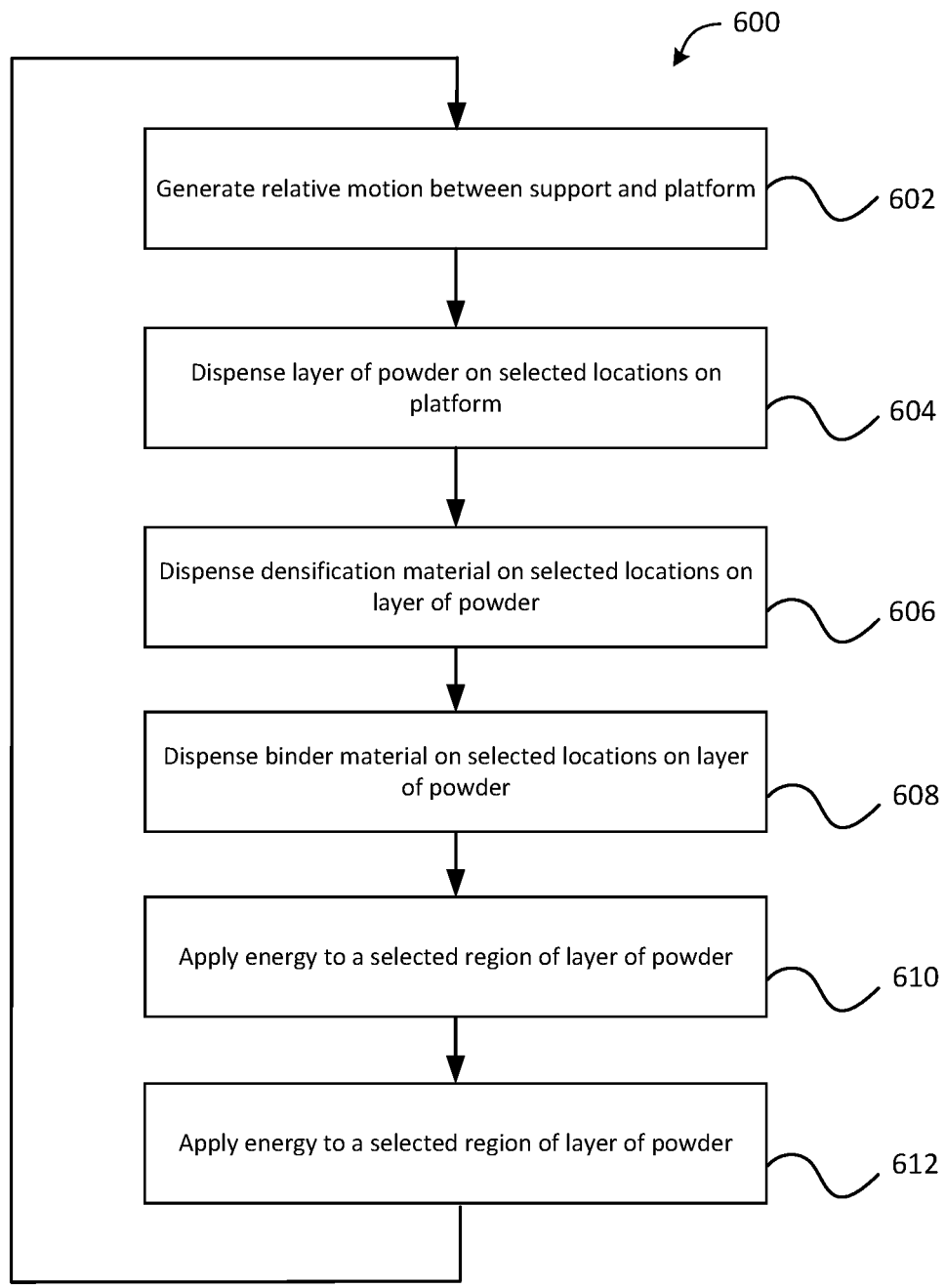
FIG. 6 is a flow chart of a process used to form one or more green parts.

FIG. 6 illustrates an example process 600 to form a green part. For example, the apparatus 100, including the controller 111, can execute the process 600.

Relative motion between the support 104 and the platform 102 is generated (602). For example, one or more actuators 127a can be operated by the controller 111 to generate the relative motion. The relative motion is controlled so that the printhead assembly 103 can be repositioned to a target location where powder particles 116, densification particles 118, and binder particles 120 are to be selectively dispensed.

A layer of powder particles 116 is dispensed on the platform 102 (604). For example, the printhead assembly 103 can be operated by the controller 111 to dispense powder particles 116. Referring also to FIG. 5, the controller 111 can control how the micro dispensers 106a dispense powder particles 116. If the powder dispenser 106 does not extend across an entire width of the platform 102 and is movable relative to the support 104, in some implementations, at operation 604, the powder dispenser 106 scans along Y-axis to dispense powder particles 116 along the entire width of the platform 102.

Optionally, densification particles 118 are dispensed at selected locations on the layer of powder particles 116 (606). For example, the densification material dispenser 108 can be operated by the controller 111 to dispense densification particles. If the densification material dispenser 108 does not extend across an entire width of the platform 102 and is movable relative to the support 104, in some implementations, at operation 606, the densification material dispenser 108 scans along Y-axis to dispense densification particles 118 along the entire width of the platform 102.

Binder material 120 is dispensed at selected locations on the layer of powder—densification particle mixture (608). If the binder material dispenser 110 does not extend across an entire width of the platform 102 and is movable relative to the support 104, in some implementations, at operation 608, the binder material dispenser 110 scans along Y-axis to dispense binder particles 120a along the width of the platform 102.

Energy delivery system 112 solidifies the binder material 120a to form a layer in which the powder particles are held in a solidified matrix of the binder material. For example, the energy delivery system can cure the liquid binder material 120b.

The controller, e.g., the controller 111, can be implemented in digital electronic circuitry, or in computer software, firmware, or hardware, or in combinations of them. The controller can include one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The controller 111 and other computing devices part of systems described can include non-transitory computer readable medium to store a data object, e.g., a computer aided design (CAD)-compatible file that identifies the pattern in which the feed material should be formed for each layer. For example, the data object could be a STL-formatted file, a 3D Manufacturing Format (3MF) file, or an Additive Manufacturing File Format (AMF) file. For example, the controller could receive the data object from a remote computer. A processor in the controller 111, e.g., as controlled by firmware or software, can interpret the data object received from the computer to generate the set of signals necessary to control the components of the apparatus 100 to deposit and/or cure each layer in the desired pattern.

A number of implementations have been described. Nevertheless, it will be understood that various modifications may be made.

Thickness of each layer of the layers of powder particles 116 and size of each of the voxels may vary from implementation to implementation. In some implementations, when dispensed on the platform 102, each voxel can have a width of, for example, 10 μm to 1 mm, e.g., 10 μm to 50 μm (e.g., 10 μm to 30 μm, 20 μm to 40 μm, 30 μm to 50 μm, approximately 20 μm, approximately 30 μm, or approximately 50 μm), or 50 μm to 1 mm (e.g., 50 μm to 300 μm, 50 μm to 100 μm, 100 μm to 300 μm). Each layer can have a predetermined thickness. The thickness can be, for example, 10 μm to 125 μm (e.g., 10 μm to 20 μm, 10 μm to 40 μm, 40 μm to 80 μm, 80 μm to 125 μm, approximately 15 μm, approximately 25 μm, approximately 60 μm, or approximately 100 μm).

The powder can include metallic particles. Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals.

The powder can include ceramic particles. Examples of ceramic materials include metal oxide, such as ceria, alumina, silica, aluminum nitride, silicon nitride, silicon carbide, or a combination of these materials, such as an aluminum alloy powder.

In some implementations, the powder particles 116 can a mean diameter between 1 and 500 μm, e.g., between 5 μm and 50 μm, e.g., between 5 μm and 10 μm, between 10 μm and 100 μm.

In some examples, the additive manufacturing apparatus 100 includes 1, 2, or 3 printheads have been described. Alternatively, the apparatus 100 includes four or more printheads. Each of the printheads is, for example, mounted onto the support 104. The printheads are thus movable as a unit across the platform 102. In some examples, the printheads can be mounted on different supports and are movable independent of each other. In some cases, the apparatus 100 includes 8 or more printheads, e.g., 8 printheads, 12 printheads, etc. that are aligned along the scanning direction.

Numerous examples are given in the above description with specific details; however, it is understood that these examples may be practiced without limitations to these specific details. Furthermore, it is understood that the examples may be used in combination with each other.

Although the apparatus has been described in the context of fabricating articles using binder jetting, the apparatus can be adapted for fabrication of articles by other powder-based methods. For example

- In some implementations, the densification material dispenser 108 is optional. For example, the energy delivery system 112 cures a layer of only powder and binder material.
- In some implementations, the energy delivery system 112 is optional. For example, binder material 120 can self-cure by cooling and does not require additional radiation beam 122.
- In some implementations, the binder material dispenser is optional. For example, if the system is to be used to fabricate a final part (rather than a green part), then powder can be delivered by one or more of the dispensers 106, and the energy delivery system can be used to fuse the powder on the platform.
- The energy source can be on a separate support rather than on the same support as the binder material dispenser. Alternatively, the energy source could be immobile relative to the platform, and be configured to fuse the entire layer simultaneously.

Accordingly, other implementations are within the scope of the claims.

What is claimed is:

1. An additive manufacturing apparatus comprising:
   a platform;
   one or more supports positioned above the platform;
   an actuator coupled to at least one of the platform and the one or more supports and configured to create relative motion therebetween such that the one or more supports scan across the platform,
   a first dispenser system configured dispense a plurality of successive layers of powder onto a build area supported by the platform, wherein the first dispenser system includes a first powder dispenser that is attached to and moves with a first support from the one or more supports and is configured to selectively dispense a first powder onto the build area;
   a second dispenser system configured to dispense a binder material onto the build area, wherein the second dispenser system includes a first binder material dispenser configured to selectively dispense a first binder material on a voxel-by-voxel basis to an uppermost layer of powder in the build area to form a volume of the layer having powder and binder material and corresponding to a cross-sectional portion of a part being built, and wherein the first powder dispenser is configured to selectively dispense the powder on a region-by-region basis along a linear area, where regions are larger than voxels; and
   an energy source configured to emit radiation toward the platform so as to solidify the binder material.

2. The apparatus of claim 1, wherein the first support is movable along a first axis, the first powder dispenser is configured to selectively dispense the powder in a strip along a second axis that is at a non-zero angle relative to the first axis, and wherein the first binder material dispenser and energy source are attached to and move with the first support.

3. The apparatus of claim 2, wherein the first binder material dispenser is configured to selectively dispense the binder material in a strip along the second axis.

4. The apparatus of claim 1, wherein the first support is movable along a first axis, the first powder dispenser is configured to selectively dispense the powder in a strip along a second axis that is at a non-zero angle relative to the first axis, wherein the first binder material dispenser and energy source are attached to and move with a second support from the one or more supports, and wherein the second support is movable along a third axis, and the first binder material dispenser is configured to selectively dispense the binder material in a strip along a fourth axis that is at a non-zero angle relative to the third axis.

5. The apparatus of claim 4, wherein the third axis is parallel to the first axis.

6. The apparatus of claim 5, wherein the fourth axis is parallel to the third axis.

7. The apparatus of claim 4, wherein the third axis is perpendicular to the first axis.

8. The apparatus of claim 7, wherein the fourth axis is perpendicular to the third axis.

9. The apparatus of claim 1, wherein the first powder dispenser has a first plurality of individually controllable orifices, each orifice of the first plurality of orifices configured to controllably deliver the first powder.

10. The apparatus of claim 1, wherein the first dispenser system includes a plurality of first powder dispensers, each first powder dispenser attached to the first support, the plurality of first powder dispensers arranged in a staggered pattern so as to cover a width of the build area.

11. The apparatus of claim 1, comprising a controller having a memory configured to store a data object that identifies a pattern in which the binder material is to be solidified in a layer of an object to be fabricated, the controller configured to configured to, for the layer,
   cause the actuator to create relative motion between the support and the platform;
   cause the first dispenser system to dispense a layer of powder in regions that encompasses the cross-sectional portion of the part being built as the support scans across the platform,
   cause the second dispenser system to dispense a layer of binder material on the layer of powder in the pattern based on the data object to provide a combined layer of powder and binder material corresponding to the cross-sectional portion of the part being built, and
   control the energy source to solidify the binder material in the combined layer in accord with the pattern.

12. The apparatus of claim 1, wherein the energy source comprises a light source configured to illuminate a stripe along of the uppermost layer.

13. The apparatus of claim 12, wherein the energy source is coupled to a support from the plurality of supports, and the support is movable along an axis at a non-zero angle relative to the stripe to sweep the stripe across the build area.

* * * * *

UNITED STATES PATENT AND TRADEMARK OFFICE
CERTIFICATE OF CORRECTION

PATENT NO.        : 11,090,724 B2
APPLICATION NO.   : 15/926997
DATED             : August 17, 2021
INVENTOR(S)       : Hou T. Ng, Nag B. Patibandla and Daihua Zhang It is certified that error appears in the above-identified patent and that said Letters Patent is hereby corrected as shown below:

In the Claims

Column 22, Line 44, in Claim 11, delete "configured to configured to," and insert --configured to-- therefor.

Column 22, Line 60, in Claim 12, after "along" delete "of".

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*